United States Patent
Enomoto

(10) Patent No.: US 7,245,319 B1
(45) Date of Patent: Jul. 17, 2007

(54) DIGITAL IMAGE SHOOTING DEVICE WITH LENS CHARACTERISTIC CORRECTION UNIT

(75) Inventor: Jun Enomoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/330,096

(22) Filed: Jun. 11, 1999

(30) Foreign Application Priority Data

Jun. 11, 1998 (JP) .................... 10-163194

(51) Int. Cl.
  *H04N 5/228* (2006.01)
  *H04N 5/217* (2006.01)

(52) U.S. Cl. .................... 348/222.1; 348/241

(58) Field of Classification Search ............. 348/360, 348/355, 96, 97, 105, 222.1, 241, 335, 231.99, 348/231.6, 231.3; 382/298, 300; 235/462.05, 235/462.11
  See application file for complete search history.

(56) References Cited

U.S. PATENT DOCUMENTS

| | | | | |
|---|---|---|---|---|
| 5,185,667 A | * | 2/1993 | Zimmermann | 358/209 |
| 5,276,519 A | * | 1/1994 | Richards et al. | 358/209 |
| 5,818,527 A | * | 10/1998 | Yamaguchi et al. | 348/335 |
| 5,905,530 A | * | 5/1999 | Yokota et al. | 348/240.99 |
| 6,097,430 A | * | 8/2000 | Komiya et al. | 348/218.1 |
| 6,219,446 B1 | * | 4/2001 | Kiriki et al. | 382/167 |
| 6,323,934 B1 | * | 11/2001 | Enomoto | 355/40 |
| 6,343,146 B1 | * | 1/2002 | Tsuruoka et al. | 382/163 |
| 6,476,869 B1 | * | 11/2002 | Sekine et al. | 348/335 |
| 6,538,691 B1 | * | 3/2003 | Macy et al. | 348/222.1 |
| 6,587,224 B1 | * | 7/2003 | Nabeshima et al. | 358/1.9 |
| 6,618,081 B1 | * | 9/2003 | Harada et al. | 348/231.6 |
| 6,775,419 B2 | * | 8/2004 | Maeda et al. | 382/275 |

FOREIGN PATENT DOCUMENTS

| | | |
|---|---|---|
| JP | 6-98170 A | 4/1994 |
| JP | 6-178197 A | 6/1994 |
| JP | 6-181530 A | 6/1994 |
| JP | 6-205273 A | 7/1994 |
| JP | 6-319106 A | 11/1994 |
| JP | 7-67028 A | 3/1995 |
| JP | 9-74514 A | 3/1997 |

* cited by examiner

*Primary Examiner*—Vivek Srivastava
*Assistant Examiner*—Justin Misleh
(74) *Attorney, Agent, or Firm*—Birch, Stewart, Kolasch & Birch, LLP

(57) ABSTRACT

The digital image shooting device is composed of an image forming lens, an image sensor element, a data processing unit for processing an output signal from the image sensor element into digital image data, an image memory for storing the digital image data; and a lens characteristic correction unit for performing a process of correcting a deterioration of an image quality derived from the image forming lens upon the digital image data by using a lens characteristic of the image forming lens and a position of a frame image photographed. The digital image shooting device is capable of obtaining the image quality which is high enough for the utilization even by using the comparatively low-price lens which does not exhibit a high performance.

12 Claims, 3 Drawing Sheets

DIGITAL IMAGE SHOOTING DEVICE WITH LENS CHARACTERISTIC CORRECTION UNIT

BACKGROUND OF THE INVENTION

The present invention relates generally to a technical filed of a digital image shooting device such as a digital camera, and more particularly to a digital image shooting device capable of photographing (outputting) a high-quality image of which aberrations are corrected even in a case of incorporating a comparatively low-price lens which performance is not so good.

A digital camera, which had initially a small number of pixels and of which representation was in monochrome, has therefore been limited its use to a special application. With a remarkable decrease in costs for the electronic parts of CCD sensors, etc., however, a color representation becomes possible easily, and the application of image data processing expands with a spread of a personal computer. Under such circumstances, the digital camera sharply decreases in price and seems to be popularized.

Recently, a high quality digital camera of which pixel number exceeds 1,000,000 have been commercialized one after another, and also with regard to a memory for storing (recording) the image, there is a tendency of the digital camera to shift from a type of being built in the body of it to a type of using a removable storage medium having a larger capacity.

In the latter type of the digital camera using the removable storage medium, a process of taking the recorded image data into a personal computer becomes highly simple.

As explained above, an enhancement of the image quality in the digital camera is largely influenced by, in addition to an increase in the number of recordable pixels, a performance improvement of an image forming lens, and an improvement of an image processing technology of the photographed image data.

For instance, some of the digital cameras (DS-300 made by Fuji Photo Film Co.,Ltd.) use a 3-powered zoom lens as an image forming lens, of which a lens configuration is based on 3 lens units containing 9 lens elements, and this type of the digital camera becomes substantially equal to a compact camera in terms of the image quality.

However, by using the high-accuracy and high-performance lens, the digital camera which can output the high-quality image can be realized and, while on the other hand, it might be a factor for raising the costs of the digital camera.

conversely, by using the comparatively low-price lens, it is possible to decrease the costs of the digital camera. However it can not be denied that the low-price lens is inferior in performance so that for example, there might occur a chromatic aberration of magnification, a distortion aberration and a decrease in marginal lumination, and quality of the image falls down such that a distortion and a density gradient occur with the outputted image.

SUMMARY OF THE INVENTION

The present invention has been accomplished under these circumstances and has as an object providing a low cost digital image shooting device capable of obtaining the image quality which is high enough for the utilization even by using the comparatively low-price lens which performance is not so high.

In order to attain the object described above, the invention provides a digital image shooting device comprising: an image forming lens; an image sensor element; a data processing unit for processing an output signal from the image sensor element into digital image data; an image memory for storing the digital image data; and a lens characteristic correction unit for performing, by using a lens characteristic of the image forming lens and a position of a frame image photographed, a process of correcting a deterioration of an image quality derived from the image forming lens upon the digital image data.

It is preferable that the image quality deterioration corrected by the lens characteristic correction unit is at least one of a chromatic aberration of magnification, a distortion aberration, defocusing and a decrease in marginal lumination.

It is also preferable that the lens characteristic correction unit corrects the deterioration of the image quality before a process of compressing the digital image data.

It is further preferable that the lens characteristic correction unit performs the correction before the photographing of a next frame or during the photographing of the next frame onward, and the digital image data of the frame which is performed the correction by the lens characteristic correction unit is stored in the image memory.

It is also further preferable that the image memory is a built-in image recording medium or a removable image recording medium.

It is still further preferable that the digital image shooting device of the invention further comprises an image display unit for displaying the photographed image, wherein an image based on the digital image data which is or is not performed the correction process in the lens characteristic correction unit, is displayed on the image display unit, and the digital image data performed the correction process in the lens characteristic correction unit, is stored in a memory.

It is also still further preferable that an image of a region larger than a photographic region confirmed by a photographer is formed on the image sensor element in accordance with missing of pixels which is caused as a result of the correction by the lens characteristic correction unit.

DETAILED DESCRIPTION OF THE INVENTION

The digital image shooting device of the present invention will hereinafter be described in details based on a preferred embodiment which will be illustrated in the accompanying drawings.

Figure 1:
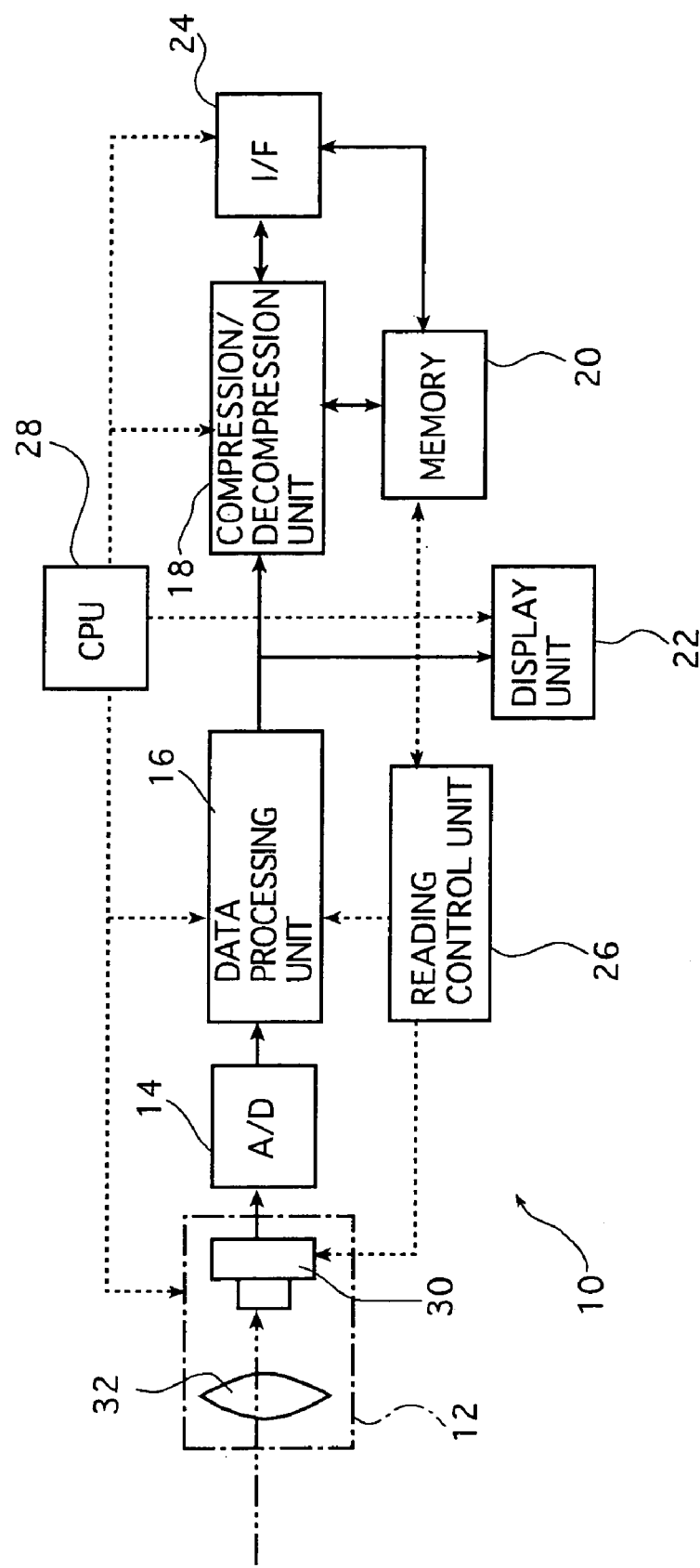
FIG. 1 is a block diagram schematically showing one example of the digital camera according to the present invention.

FIG. 1 is a block diagram showing one example of the digital camera according to the present invention.

Referring to FIG. 1, a digital camera 10 includes an image shooting unit 12, an A/D (analog-to-digital) converter 14, a data processing unit 16, a data compressing unit (which is hereinafter simply termed a compression unit) 18, an image memory 20, a display unit 22, an I/F (interface) unit 24, a reading control unit 26, and a CPU 28 for managing and controlling these units and the whole digital camera 10.

Note that solid lines indicate a flow of image signals (image data), and dotted lines indicate a flow of control signals respectively in FIG. 1.

The image shooting unit 12, which shoots a photographic subject (a scene) and outputs signals after photoelectric conversion, has a color CCD sensor (hereinafter simply referred to as a sensor) 30 for photoelectrically reading the image by separating the image into three primary colors red (R), green (G) and blue (B), an image forming lens 32 for forming the subject image on the sensor 30 and, in addition, though not illustrated, a variable stop for controlling a quantity of light beams incident in the sensor 30, and an amplifier for amplifying output signals from the sensor 30.

The output signals (the image signals) from the imaging unit 12 are converted to digital image signals by the A/D converter 14, and thereafter transmitted to the data processing unit 16.

Note that the reading control unit 26 controls such as an image reading (sampling) timing of the sensor 30, an electronic shutter speed (a storage time), and a processing timing of the image signal in the data processing unit 16, corresponding thereto.

Figure 2:
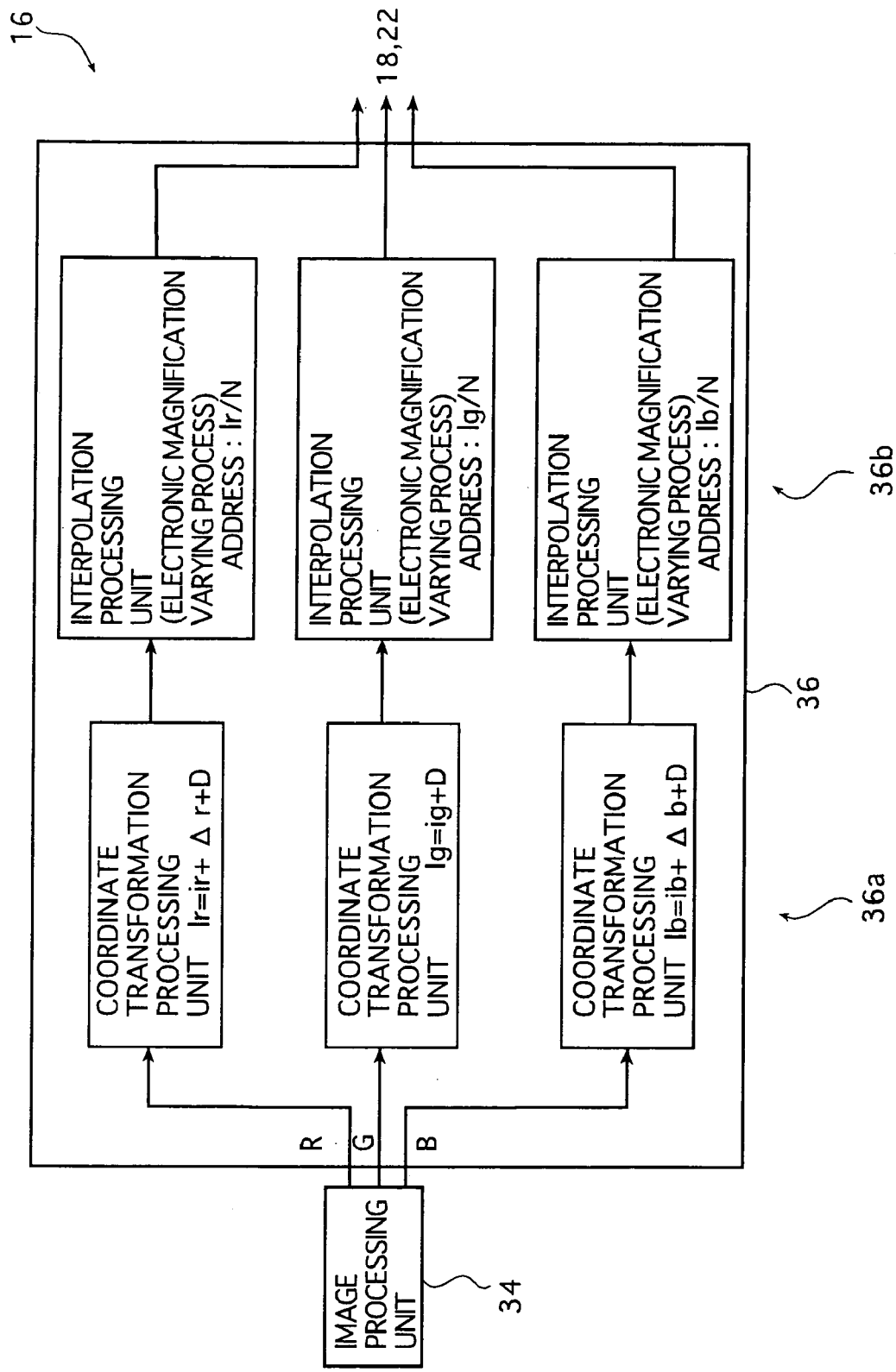
FIG. 2 is a block diagram schematically showing a data processing unit of the digital camera shown in FIG. 1.

The data processing unit 16, which makes a predetermined data processing on the digital image signals converted by the A/D converter 14 and outputs it as an output image data (hereinafter simply referred to as image data) to the compression unit 18 and the display unit 22, as illustrated in FIG. 2, includes an image processing unit 34 and a lens characteristic correction unit 36 that is particular to the present invention. It is to be noted that a processing condition in the data processing unit 16 is set by, e.g., the CPU 28.

The image processing unit 34 makes a variety of image processes such as a conversion of the image signal into the image (density) data, white balance control of the image, gray balance control thereof, density control thereof, color balance control thereof and a sharpness (sharpening) process.

On the other hand, the lens characteristic correction unit (hereinafter be simply called a characteristic correction unit) 36 corrects deterioration of image quality origination in lens characteristics of the image forming lens 32 by using the lens characteristics of the image forming lens 32 an image position. The characteristic correction unit 36, in the embodiment illustrated herein, corrects a chromatic aberration of magnification and a distortion aberration originating in the lens characteristic and, more preferably, corrects aberrations such as a decrease in marginal lumination and defocusing.

As known well, a color image is formed of the three primary colors of R, G and B, however, a refractive index (an image forming magnification) of the lens is subtly different depending on a wavelength, and therefore the image forming magnifications of light of R, G and B is different, viz., the chromatic aberration of magnification occurs. Hence, if the image formed on the sensor 30 is just reproduced as a visible image, a color deviation occurs on the obtained image.

Further, it is required for obtaining a high-quality photographic image that a plane perpendicular to the optical axis is formed on the image forming plane corresponding thereto. In a lens which performance is not so good, however, a deviation of the image forming position occurs in the optical-axis direction and a distortion i.e. distortion aberration occurs on the formed image. Consequently, if the image formed on the sensor 30 is just reproduced as the visible image, the distortion might occur on the obtained image.

As described above, if the image containing the chromatic aberration of magnification and the distortion aberration is shown on a display, and just reproduced as the visible image in the form of a hardcopy or etc., on outputted image becomes an image which has a color deviation, a peripheral distortion, a decrease in the marginal lumination and defocusing and so on.

Therefore, the digital camera 10 according to the present invention includes the characteristic correction unit 36 to correct the chromatic aberration of magnification and the distortion aberration originating in the lens characteristics so that even when using a low-price lens, the digital camera 10 is able to output the high-quality image with a stability that there is neither the distortion nor the color deviation, and a cost for the digital camera can be remarkably reduced.

The characteristic correction unit 36 memorizes the lens characteristics of the image forming lens 32 incorporated into the digital camera 10, and corrects the chromatic aberration of magnification and the distortion aberration, etc. of the image on the basis of the lens characteristics.

The lens characteristics is not limited particularly. However, generally the characteristics of the chromatic aberration of magnification and the distortion aberration of the lens and the characteristics of the aberrations such as the decrease in the marginal lumination and the defocusing, can be approximated to some extent by a cubic function which uses a distance (which is expressed by, e.g., x-y) from the optical axis of the lens, i.e., from the center of the image as a parameter. Hence, corresponding to the image forming lens 32 mounted on the camera, a function representing the characteristic of the chromatic aberration of magnification and a function representing the distortion aberration corresponding thereto, may be stored as lens characteristics.

The characteristic correction unit 36 performs the process of correcting the chromatic aberration of magnification and the distortion aberration by use of the above-mentioned lens characteristics and the image position i.e., an information of the position of the image data (pixels), e.g., a coordinate position (pixel number from the center) from the center of the image.

Note that the coordinates in this case may be the x-y coordinates or the polar coordinates. Further, the information of the position of the image data is not restricted to the center of the image as a basis, but various kind of things can be used. For example, a corner portion (such as a left upper corner, etc.) of the image and a certain pixel (e.g., a pixel of a pixel number No.1) may be set as a basis. Namely, according to the present invention, the various kind of position information can be used, which detects the position of the image (pixels) relatively.

Herein, however, if the chromatic aberration of magnification and the distortion aberration are separately corrected by using the lens characteristics and the position information (hereinafter referred to as pixel position), the calculation takes a long time and an interpolating calculation needs to be done a plurality of times so that there arises a problem that the image quality might be deteriorated.

Therefore, in the embodiment illustrated herein, a preferable mode is that image magnifications of R and B are converted with "G" being normally a basic color among the three primary colors of R, G, and B, the chromatic aberration of magnification is corrected by matching the R and B images with the G image, and thereafter the distortion aberration is corrected. A proper position of each pixel is thereby calculated, and the image data of each pixel is subjected to the interpolating calculation, thereby making it feasible to obtain the image data in which the chromatic aberration of magnification and the distortion aberration of the photographed image are corrected.

Accordingly, the calculation for the G image may suffice for the distortion aberration, and hence the chromatic aberration of magnification and the distortion aberration can be corrected under a more preferable condition because of a reduction in quantity of normal and interpolating calculations.

The characteristic correction unit 36 for carrying out the correcting method described above, as shown in the conceptual diagram in FIG. 2, includes a coordinate transformation processing unit 36a and an interpolation processing unit 36b.

Incidentally, referring to FIG. 2, Ir, Ig and Ib designate the pixel positions (addresses) of the image data (input image data) supplied from the image processing unit 34, ir, ib and ib represent the pixel positions of the image data of which the chromatic aberration of magnification and the distortion aberration are corrected, $\Delta r$ and $\Delta b$ denote the deviation quantities (i.e., the correction quantities) of the R- and B-pixel positions from the G-pixel position due to the chromatic aberration of magnification, and D designates the deviation quantity of the G-pixel position due to the distortion aberration.

The characteristic correction unit 36, when supplied with the image data from the image processing unit 34, makes the coordinate transformation processing unit 36a calculate the deviation quantities $\Delta r$ and $\Delta b$ of the pixel values ir and ib of the R- and B-image data from the G-image data ig due to the chromatic aberration of magnification by use of the lens characteristics described above, and further calculate the deviation quantity D of the input G-image data ig due to the distortion aberration.

Next, as shown in FIG. 2, the coordinate transformation processing unit 36a calculates the pixel position Ir of the R-image data of which the chromatic aberration of magnification and the distortion aberration are corrected by adding $\Delta r$ and D to each pixel position ir of the input R-image data. Then, the coordinate transformation processing unit 36a calculates the pixel position Ib of the B-image data of which the chromatic aberration of magnification and the distortion are corrected by adding $\Delta b$ and D to each pixel position ib of the input B-image data. Further, the coordinate transformation processing unit 36a calculates the pixel position Ig of the G-image data of which the distortion is corrected by adding D to each pixel position ig of the input G-image data.

That is, the calculation proceeds such as correcting the chromatic aberrations of magnification of the R- and B-images with the G-image as a basis, making the positional alignment of the whole images with the G-image, correcting the distortion aberration of the whole by use of the deviation quantity D of the G-image due to the distortion aberration, and thus calculating the pixel positions of the R- G- and B-images of which the chromatic aberrations of magnification and the distortion aberration are corrected.

The interpolation processing unit 36b calculates the image data of which the chromatic aberration of magnification and the distortion aberration are corrected by executing a data interpolating process (N-times interpolation), which involves the use of the pixel positions Ir, Ig and Ib with the chromatic aberration of magnification and the distortion aberration being corrected in the coordinate transformation processing unit 36a, and supplies the thus calculated image data to a decompression unit 18 and/or a display unit 22. Namely, according to this method, the deviation quantity of the pixel position which is attributed to the chromatic aberration of magnification and the distortion aberration, is calculated, thereby recognizing which position each pixel (the image data concerned) should normally exist in. Then, the interpolating (calculating) process of the image data is executed in accordance with that proper position, thereby obtaining the image data of which the chromatic aberration of magnification and the distortion aberration are corrected.

The interpolation processing method is not particularly limited, and a variety of known methods such as, e.g., a bilinear interpolation and a spline interpolation, etc. can be utilized.

There have been in recent years many types of digital cameras 10, to which a zooming function is added, capable of the photography to form an image by changing the magnification through a zoom lens.

The zooming photography is optically conducted by principally changing the image forming magnification of the image forming lens 32. If the optical variable power of the image forming lens 32 is not sufficient enough to cover a photographic magnification variable range, however, an electronic magnification varying process based on the image data is executed, thereby enlarging or reducing the image.

Note that if photographed by use of the zoom lens, the aberrations described above may be corrected preferably based on the lens characteristics corresponding to each focal length. In this case, it is preferable to store the lens characteristics at a plurality of focal lengths of the zoom lens, convert the lens characteristics at the plurality of focal lengths with the focal length when photographed, and obtain the lens characteristic at the focal length when photographed through the lens. Herein, as for the lens characteristics, each of the lens characteristics at switchable focal lengths may be held (stored), or the lens characteristic at each focal length exhibiting a high photographic probability, may respectively be stored, or the lens characteristics on the order of three stages such as T (Telephoto), M (Middle, or Standard) and W (Wide-angle) may be stored. Note that a lens characteristic at a focal length which is not stored can be obtained by effecting the interpolating calculation from the lens characteristics at focal lengths anterior and posterior to that non-stored focal length.

On the other hand, the digital cameras 10 each having an interchangeable lens has been recently put on the market, and the interchangeable lens of the conventional camera using the photographic film is usable in some of those cameras. In the case of taking a photo using such an interchangeable lens, there are required the lens characteristics of the interchangeable lens. Therefore, the lens characteristics corresponding to lens data are stored for every usable interchangeable lens, the interchangeable lens data are received from the interchangeable lens on the occasion of the photography, and the aberrations described above may be corrected based on the lens characteristics.

Figure 3A:
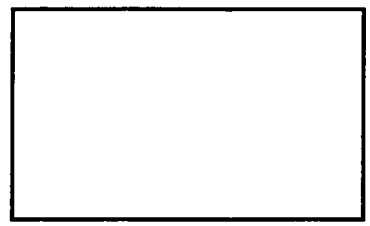
FIGS. 3A, 3B and 3C are conceptual diagrams each showing an image deformation by aberration correction.
Figure 3B:
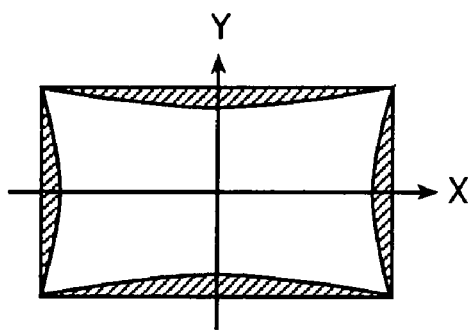

Incidentally, the distortion aberration normally takes a bobbin winder shape shown in FIG. 3B at the telephoto, and a barrel shape in contrast with the bobbin winder at the wide angle, and may be corrected in both cases. The chromatic aberration of magnification is not, however, conspicuous at the wide angle, and therefore the correcting process may be omitted.

Thus, in the case of performing the photography using the zoom lens and the interchangeable lens, it is preferable that the image aberrations derived from the lens through which the subject image is photographed be corrected by using the data on the focal length of the lens when photographing the subject image, the lens characteristics at that focal length, and the positional data of the image. It is also preferable on the occasion of correcting the aberrations described above that the lens characteristics at the plurality of focal lengths stored are converted with the focal length when photographing, the lens characteristic at the focal length when photographing through this lens are obtained, or the lens characteristic at the focal length of the interchangeable lens used are obtained, there is calculated using the obtained lens characteristic the deviation quantities, attributed to the chromatic aberration of magnification, of the image positions of the colors other than the color which is fiducial for the three primary colors, a proper position of each image of which the distortion aberration and the chromatic aberration of magnification are corrected is calculated by use of the deviation quantity due to the chromatic aberration of magnification and the deviation quantity of the fiducial color image position which is attributed to the distortion aberration, and the distortion aberration and the chromatic aberration of magnification are corrected using this proper position, or the electronic magnification varying process is executed using this proper position.

Such processes being thus implemented, in the case of even the subject image photographed by a comparatively low-price digital camera using the lens which does not exhibit a high lens performance, it is feasible to correct the deterioration of the image quality by executing the image processing, which is derived from the image aberration, viz., the image quality deterioration induced from the aberration of the lens, and output stably the high-quality image with no distortion and no color deviation, depending on neither the photographic magnification nor the focal length.

As known well, the electronic magnification varying process is executed by effecting the interpolating process on the image data, however, the interpolating process is followed by the deterioration of the image quality, and therefore it is preferable that the number of interpolating processes be minimized.

Accordingly, the interpolation processing unit 36b in the embodiment illustrated herein, by way of a preferable mode on the occasion of executing the electronic magnification varying process, controls a magnification (N-powered interpolation) in the interpolating calculation in accordance with an electronic magnification varying rate when effecting the interpolating process for obtaining the image data of which the above-mentioned aberrations are corrected, and simultaneously executes the electronic magnification varying process. It is feasible in this embodiment to correct the chromatic aberration of magnification and the distortion aberration, and execute the electronic magnification varying process by performing the interpolating process once.

Incidentally, as discussed above, the image exhibiting neither the color deviation nor the distortion can be obtained after correcting the chromatic aberration of magnification and the distortion aberration. When these aberrations are corrected, however, there might be a case where a configuration and a size of the image change.

For instance, if the image before being corrected presents the bobbin winder shaped distortion aberration as shown in FIG. 3A, the image after the correction, as illustrated in FIG. 3B, takes a configuration that the central portions of face-to-face sides of the rectangular shape largely shrink from both side ends toward the center in X- and Y-directions, wherein there might occur so-called vignetting which corresponds to oblique-line regions where the image can not be reproduced.

The digital camera 10 performs the photographing while confirming the photographic region on the display device 22. In this case, however, when displaying on the display device 22 the image whose aberrations have been corrected, the image containing the vignetting as shown in FIG. 3B is displayed thereon, and it follows that the image to be outputted outside similarly becomes the vignetted image.

Figure 3C:
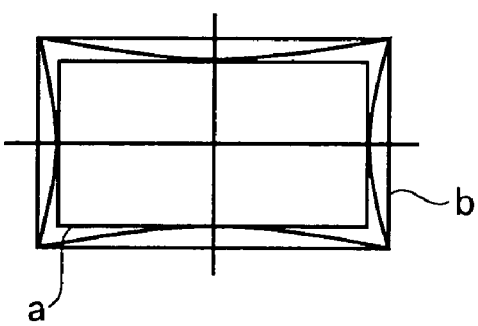

Therefore, in the digital camera 10 of the present invention, assuming previously the vignetting caused as a result of correcting the aberrations, as illustrated in FIG. 3C, it is preferable that a region 1 of the image data to be taken in after being actually photographed (after forming the image on the sensor 30) is set larger than an image region a (a visual field of a viewfinder) to be reproduced on the display device 22, and that the image region to be outputted outside is coincident with the image region a to be reproduced on the display device 22. Alternatively, the image region to be reproduced on the display device 22 may be set smaller than the region to be actually photographed, and the same outside outputting may be carried out. Further, the image after being corrected is displayed, and the image vignetted region and a cut-out region may be framed.

Moreover, the interpolating magnification in the interpolation processing unit 36b is set corresponding to a degree of the vignetting, and the slightly-enlarged image may be displayed and/or outputted outside.

According to the device in the embodiment illustrated herein, the characteristic correction unit 36 corrects both of the chromatic aberration of magnification and the distortion aberration by way of the preferable mode, however, the present invention is not limited to this mode. The characteristics of any one of the chromatic aberration of magnification and the distortion aberration are stored as the lens characteristics, and any one of these aberrations may be corrected by use of the lens characteristics and the image position.

Furthermore, there are stored the information (data) about not only at least one of the chromatic aberration of magnification and the distortion aberration but also the defocusing (PSF: Point Spread Function), the decrease in the marginal lumination, etc. attributed to the lens characteristics, and at least one of the chromatic aberration of magnification and the distortion aberration is corrected. In addition to or instead of this correction, the decrease in the marginal lumination and the defocusing may also be corrected.

Another option is that whether or not the correction pertaining to those lens characteristics should be conducted is set selectable, and the correction to be carried out may also be set selectable.

The image data processed by the interpolation processing unit 36b of the data processing unit 16 are supplied to the compression unit 18 and/or the display unit 22.

The compression unit 18 compresses the image data and supplies the image memory 20 and the I/F unit 24 with the compressed image data. The image data are thus stored in the image memory 20, and outputted from the I/F unit 24 to an outside personal computer, a TV, and outside recording mediums (a drive thereof) such as a floppy disk and an MO (magneto-optical) disk, etc. A method and a form of compressing the image data in the compression unit 18 are not particularly restricted, and the data compression may be executed by any methods and in any forms. The conventionally known methods and forms may be adopted. There may be adopted typical image data compression forms such as, e.g., JPEG, GIF and FlashFix. A selection of which form is adopted among those typical image data compression forms may be properly made corresponding to an image quality (a data quantity per frame) requested of the target image and a capacity of the image memory 20.

Note that the compression unit 18 is not limited to what compresses the image data supplied from the data processing unit 16, and may also be what rereads the compressed image data from the image memory 20 and decompresses the image data in order to display on the display unit 22 the compressed image data stored in the image memory 20.

It is also to be noted that the image data compression may preferably be done after the lens characteristic correction unit 36 in the data processing unit 16 has corrected the aberrations originating in the lens. This is because the compression forms such as JPEG and FlashPix which are normally frequently used are classified as an irreversible compression form, wherein if the aberration is corrected after the compression, the correction of the aberration must be done in such a state that some pieces of the image data are missed, and the proper aberration correction is unable to be implemented.

The image memory 20 is not particularly restricted and any kinds of image recording mediums are usable but the image recording medium is capable of recording the digital image data of the subject image photographed. The recording medium may be a built-in memory so implemented in the digital camera 10 as not to be removable therefrom such as, for example, a non-volatile memory such as a flash memory, an EPROM and an EEPROM, and a RAM, or may be a removable memory such as a smart media and a card memory like a PCMCIA (PC card), an ATA card and a compact flash card, or may also be an image recording medium such as a floppy disk and an MO (magneto-optical) disk. Incidentally, it is required in the case of the built-in memory that the image data will be transmitted serially or in parallel via a cable in order for the image recording device such as a personal computer and a digital photo printer to take in the image data. In the case of the removable memory, however, the memory itself may simply be set in a slot of the image recording device such as the personal computer and the digital photo printer, which is preferable because of no necessity for transferring the image data and the handling being simple.

Note that the number of photographic frames in the digital camera 10 is determined by a compression rate of the image data in the compression unit 18 and by a recording capacity of the image memory 20. In the digital camera 10, it is preferable that the recording capacity of the image memory 20 is larger because of a greater number of photographic frames. If the recording capacity is large, however, a physical size of the image memory 20 becomes large, and hence it is preferable to properly select the recording capacity of the image memory 20 in accordance with the physical size and the required number of photographic frames.

The display unit 22 displays as a visible image the image data (image) processed by the data processing unit 16, and as described above, it is used as the viewfinder when in the photographing.

The display unit 22 has no limit, there are a variety of usable known display devices such as a liquid crystal display utilized in the digital camera 10.

Herein, in the digital camera 10 of the present invention, the image displayed on the display unit 22 may be an image processed by both of the characteristic correction unit 36 and the image processing unit 34 of the data processing unit 16, or may be an image processed by only the image processing unit 34 without the correction of the aberrations. These settings may be properly made corresponding to a photographing speed requested to the digital camera 10, or may preferably be selectable.

It is, however, preferable that the image stored in the image memory 20 and the image outputted outside from the I/F unit 24 are performed the correction of the aberrations in the characteristic correction unit 36, and the image performing no correction of the aberrations or the like may be combined with the data required for the correction of the lens characteristics and then stored in the image memory 20 or outputted outside from the I/F unit 24.

In the thus constructed digital camera 10 according to the present invention, after the one frame image has been photographed, the data processing unit 16 may process the image data of this frame and stores the image data in the image memory 20 then the next frame image may be photographed, or the data processing unit 16 may perform the image data processing during the photographing of the next frame onward.

The mode of performing the process during the photographing of the next frame image onward has an advantage of being capable of quick photographing (consecutive photographing) on one hand, and is disadvantageous in terms of costs because of requiring the memory for storing the frame images photographed during the image processing on the other hand.

Further, in the digital camera 10, the image photographed is displayed on the display unit 22, then stored in the image memory 20 and outputted from the I/F unit 24. Besides, the image data temporarily stored in the image memory 20 may be decompressed by the compression unit 18 and then displayed on the display unit 22, or alternatively the image data may be received from the I/F unit 24 and displayed on the display unit 22 or stored in the image memory 20.

In the above example, the digital camera have been explained as a representative example of the digital image shooting device of the present invention. However, the present invention is not limited to the above mentioned example, as the digital image shooting device of the present invention, for instance, products in the form of the camera such as a digital video camera, and, in addition, a digital image shooting device which includes an image forming lens and an image sensor element in part is not the form of camera itself such as a computer which includes a function of a camera partially and various kinds of image forming devices and image pickup devices.

One embodiment of the digital image shooting device of the present invention has been discussed so far, however, the present invention is not limited to the above embodiment but may be changed and modified in a variety of forms without deviating from the scope of the present invention.

As discussed above in details, according to the present invention, it is feasible to attain the digital image shooting device capable of obtaining the quality which is high enough for the utilization even by using the comparatively low-price lens which does not exhibit a high performance.

What is claimed is:

1. A digital image shooting device comprising:
   an image forming lens;
   an image sensor element;
   a data processing unit for processing an output signal from said image sensor element into digital image data;
   an image memory for storing the digital image data and a lens characteristic relating to the image forming lens; and
   a lens characteristic correction unit for performing, by using the stored lens characteristic of said image forming lens and a position of a frame image photographed, a process of correcting a deterioration of an image quality derived from said image forming lens upon the digital image data, to obtain processed image data, before a shooting of a next frame of an image, in which the processed image data is stored in said image memory prior to the shooting of the next frame, or during the shooting of the next frame onward, in which the processed image data is stored in said image memory during or after the shooting of the next frame, wherein the digital image data comprises three primary color-based image data; and wherein the lens characteristic correction unit calculates a first deviation quantity of a first color-based image data due to the deterioration of the image quality, the first color-based image data selected among the three primary color-based image data, and calculates second deviation quantities of two color-based image data other than the first color-based image data on a basis of the calculated first deviation quantity, the second deviation quantities representing relative quantities to the first deviation quantities, and performs the process of correcting the deterioration of the image quality using the first deviation quantity and the second deviation quantities.

2. The digital image shooting device according to claim 1 wherein said image quality deterioration further includes a distortion aberration.

3. A digital image shooting device according to claim 1, wherein said lens characteristic correction unit corrects the deterioration of the image quality before a process of compressing the digital image data.

4. A digital image shooting device according to claim 1, wherein said lens characteristic correction unit performs the process of correcting a deterioration of an image quality before the shooting of the next frame or during the shooting of the next frame onward, wherein the digital image data of the frame on which the correction process is performed, and the processed image data obtained by the correction process of the lens characteristic correction unit are stored in said image memory.

5. A digital image shooting device according to claim 1, wherein said image memory is a built-in image recording medium or a removable image recording medium.

6. A digital image shooting device according to claim 1, further comprising an image display unit for displaying the photographed image,
wherein an image based on the digital image data which is or is not performed the correction process in said lens characteristic correction unit, is displayed on said image display unit, and the digital image data performed the correction process in said lens characteristic correction unit, is stored in a memory.

7. A digital image shooting device according to claim 1, wherein an image of a region larger than a photographic region confirmed by a photographer is formed on said image sensor element in accordance with missing of pixels which is caused as a result of the correction by said lens characteristic correction unit.

8. The digital image shooting device according to claim 1, wherein said image forming lens comprises a plurality of lens and said image memory stores a plurality of lens characteristics pertaining thereto.

9. The digital image shooting device of claim 1, wherein the lens is a zoom lens and the lens characteristic relates to a plurality of focal lengths of the zoom lens, wherein the lens characteristic is converted at the plurality of focal lengths to the focal length when the image is photographed.

10. The digital image shooting device of claim 1, wherein said image quality deterioration corrected by said lens characteristic correction unit is at least one of a chromatic aberration of magnification, defocusing and a decrease in marginal rumination.

11. The digital image shooting device according to claim 1, wherein the deterioration of the image quality comprises a distortion aberration and a chromatic aberration and,
the first deviation quantity due to the distortion aberration and the second deviation quantities are deviation quantities due to both the distortion aberration and the chromatic aberration.

12. A digital image shooting device comprising:
an image forming lens;
an image sensor element optically coupled to said lens;
a data processing unit connected to said image sensor and receiving an output signal from said image sensor element and converting the output signal into digital image data;
an image memory connected to said data processing unit, the digital image data and a lens characteristic relating to the image forming lens being stored in said image memory; and
a lens characteristic correction unit connected to said image memory, said lens characteristic correction unit correcting a deterioration of an image quality derived from said image forming lens upon the digital image data, to obtain processed image data, by using the stored lens characteristic of said image forming lens and a position of a frame image photographed before a shooting of a next frame of an image, in which the processed image data is stored in said image memory prior to the shooting of the next frame, or during the shooting of the next frame onward, in which the processed image data is stored in said image memory during or after the shooting of the next frame,
wherein the image quality deterioration corrected by the lens characteristic correction unit is a distortion aberration and a chromatic aberration of magnification,
wherein the digital image data comprises three primary color-based image data; and wherein the lens characteristic correction unit calculates a first deviation quantity of a first color-based image data due to the deterioration of the image quality, the first color-based image data selected among the three primary color-based image data, and calculates second deviation quantities of two color-based image data other than the first color-based image data on a basis of the calculated first deviation quantity, the second deviation quantities representing relative quantities to the first deviation quantities, and performs the process of correcting the deterioration of the image quality using the first deviation quantity and the second deviation quantities.

* * * * *